(12) United States Patent
Ikeda et al.

(10) Patent No.: US 7,934,196 B2
(45) Date of Patent: Apr. 26, 2011

(54) SOFTWARE COMPONENT AND SOFTWARE COMPONENT MANAGEMENT SYSTEM

(75) Inventors: Nobuyuki Ikeda, Fuchu (JP); Yoshihiro Takahashi, Fuchu (JP); Hirotaka Toya, Kawasaki (JP); Katsumasa Jin, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1254 days.

(21) Appl. No.: 11/468,129

(22) Filed: Aug. 29, 2006

(65) Prior Publication Data
US 2007/0130562 A1    Jun. 7, 2007

(30) Foreign Application Priority Data
Dec. 7, 2005    (JP) .................................. 2005-353741

(51) Int. Cl.
  *G06F 9/44*    (2006.01)
(52) U.S. Cl. ...................................................... 717/120
(58) Field of Classification Search .................... 717/120
See application file for complete search history.

(56) References Cited

U.S. PATENT DOCUMENTS

| 2002/0040234 | A1* | 4/2002 | Linberg ........................... 607/32 |
| 2003/0105800 | A1* | 6/2003 | Cullen ............................ 709/201 |
| 2003/0115264 | A1* | 6/2003 | Takiyama ....................... 709/203 |
| 2003/0229726 | A1* | 12/2003 | Daseke et al. ................. 709/321 |
| 2004/0162889 | A1* | 8/2004 | Morris et al. .................. 709/217 |
| 2005/0060408 | A1* | 3/2005 | McIntyre et al. .............. 709/225 |
| 2006/0195521 | A1* | 8/2006 | New et al. ...................... 709/204 |
| 2006/0265471 | A1* | 11/2006 | Pitzel et al. .................... 709/217 |
| 2006/0271997 | A1* | 11/2006 | Jacoby et al. .................. 725/135 |
| 2007/0168309 | A1* | 7/2007 | Tzruya et al. .................. 706/45 |
| 2007/0168538 | A1* | 7/2007 | Suzuoki et al. ............... 709/230 |
| 2008/0189376 | A1* | 8/2008 | Bice et al. ...................... 709/206 |

FOREIGN PATENT DOCUMENTS
JP    11-327962    11/1999

* cited by examiner

*Primary Examiner* — Anna Deng
(74) *Attorney, Agent, or Firm* — Oblon, Spivak, McClelland, Maier & Neustadt, L.L.P.

(57) ABSTRACT

A software component, which enables a computer to execute processing, is delivered from a management department and includes at least one software module executable by the computer; a first software subcomponent configured to transmit a component identifying information for identifying the software component, to a software component managing server when the software module is executed; and a second software subcomponent configured to transmit a device identifying information for identifying the computer on which the software component is executed, to the software component managing server when the software module is executed.

10 Claims, 7 Drawing Sheets

DATA TRANSMITTED TO COMPONENT MANAGING SERVER

| | |
|---|---|
| COMPONENT IDENTIFYING INFORMATION | SOFTWARE COMPONENT NAME |
| | SOFTWARE COMPONENT IDENTIFICATION NUMBER (ID) |
| | SOFTWARE COMPONENT VERSION INFORMATION |
| SERVICE CONTRACT INFORMATION | SERVICE CONTRACTOR NAME, CONTRACTOR NUMBER |
| | SOFTWARE COMPONENT DELIVERY DATE |
| | SOFTWARE COMPONENT SERVICE PERIOD |
| | SERVICE TARGET DEVICE INFORMATION |
| DEVICE IDENTIFYING INFORMATION | SERVICE DEVICE NAME |
| | IP ADDRESS |
| | MAC ADDRESS |

SOFTWARE COMPONENT AND SOFTWARE COMPONENT MANAGEMENT SYSTEM

CROSS REFERENCE TO RELATED APPLICATION

This application is based upon and claims the benefit of priority of the prior Japanese Patent Application No. 2005-353741, filed Dec. 7, 2005, the entire contents of which are incorporated herein by reference.

BACKGROUND OF THE INVENTION

1. Field of the Invention

The present invention relates to software components and software component management systems, and particularly to a software component used as a "component" by various application software programs and to a software component management system for managing software components.

2. Description of the Related Art

In today's software development process, a plurality of program segments obtained by appropriately dividing an existing software program are often treated as components (hereinafter referred to as "software components") and combined to efficiently create a new software program.

In such a development process, it is necessary for an administrator to accurately inform users about how to use a software component. At the same time, to quickly deal with problems in the process of development using the software component, it is important for the users to accurately inform the administrator about how the software component is used, and for the administrator to correctly understand the use of the software component.

Here, "administrator" of the software component is an operator who performs management tasks for the software component. Examples of such management tasks include delivery, use tracking, version control, collecting information about defects and scalability, providing users with the collected information, and supporting the application of the software component.

"User" of the software component is an operator who uses the software component to develop an application software program. Here, an end user who indirectly uses the software component by using the application software program is not included in "user" of the software component.

JP-A 11-327962 (KOKAI) discloses a technique relating to the use of software components. In this technique, for example, visually displayable information is added to a software component included in an electronic device so that the operating conditions of the electronic device can be monitored, on the basis of the added information, via a display unit of the electronic device or via an external computer.

In product development where software programs are used as components, delivery management of the software components is an important task for an administrator. In the delivery management, the administrator has to keep track of whether software components are used by authorized users for the development of specified products, and which software component is used by which user so that information about defects and scalability can be provided as needed.

In the delivery management performed by humans, it is difficult to fully keep track of how a software component is actually used after it is delivered. For example, even if a user accidentally or intentionally applies the software component to the development of a product which is not originally intended, or transfers the software component to a third party, it is virtually impossible to reliably detect such use which is against the intention of the administrator of the software component, since the administrator cannot inspect source code and link information with respect to every development.

The technique disclosed in JP-A 11-327962 (KOKAI) aims to monitor the operating sequence of an electronic device and to detect abnormal operations, and thus is not applicable to the delivery management of software components.

SUMMARY OF THE INVENTION

The present invention has been made in view of the circumstances described above. An object of the present invention is to provide a software component and a software component management system that allow management information and use information about the software component to be transmitted, reliably and in real time, to an administrator who delivered the software component, and can thereby facilitate the appropriate use of software components, improve the efficiency of software development, and eliminate the unauthorized use of software components.

According to an aspect of the present invention, a software component, which enables a computer to execute processing, is delivered from a management department and includes at least one software module executable by the computer; a first software subcomponent configured to transmit a component identifying information for identifying the software component, to a software component managing server when the software module is executed; and a second software subcomponent configured to transmit a device identifying information for identifying the computer on which the software component is executed, to the software component managing server when the software module is executed.

According to another aspect of the present invention, a software component management system includes a component utilizing terminal for developing an application software program by incorporating a software component delivered from a management department or for using the developed application software program; and a software component managing server connected via a telecommunication line to the component utilizing terminal and configured to receive at least component identifying information for identifying the software component and device identifying information for identifying the component utilizing terminal, wherein, the software component comprising: at least one software module executable by the component utilizing terminal; a first software subcomponent configured to transmit the component identifying information for identifying the software component, to the software component managing server when the software module is executed; and a second software subcomponent configured to transmit the device identifying information for identifying the component utilizing terminal on which the software component is executed, to the software component managing server when the software module is executed.

With the software component and software component management system of the present invention, it is possible to transmit, reliably and in real time, management information and use information about the software component to an administrator who delivered the software component. This can facilitate the appropriate use of software components, improve the efficiency of software development, and eliminate the unauthorized use of software components.

DESCRIPTION OF THE PREFERRED EMBODIMENTS

Embodiments of a software component and a software component management system of the present invention will now be described with reference to the attached drawings.

(1) Software Component Management System

Figure 1:
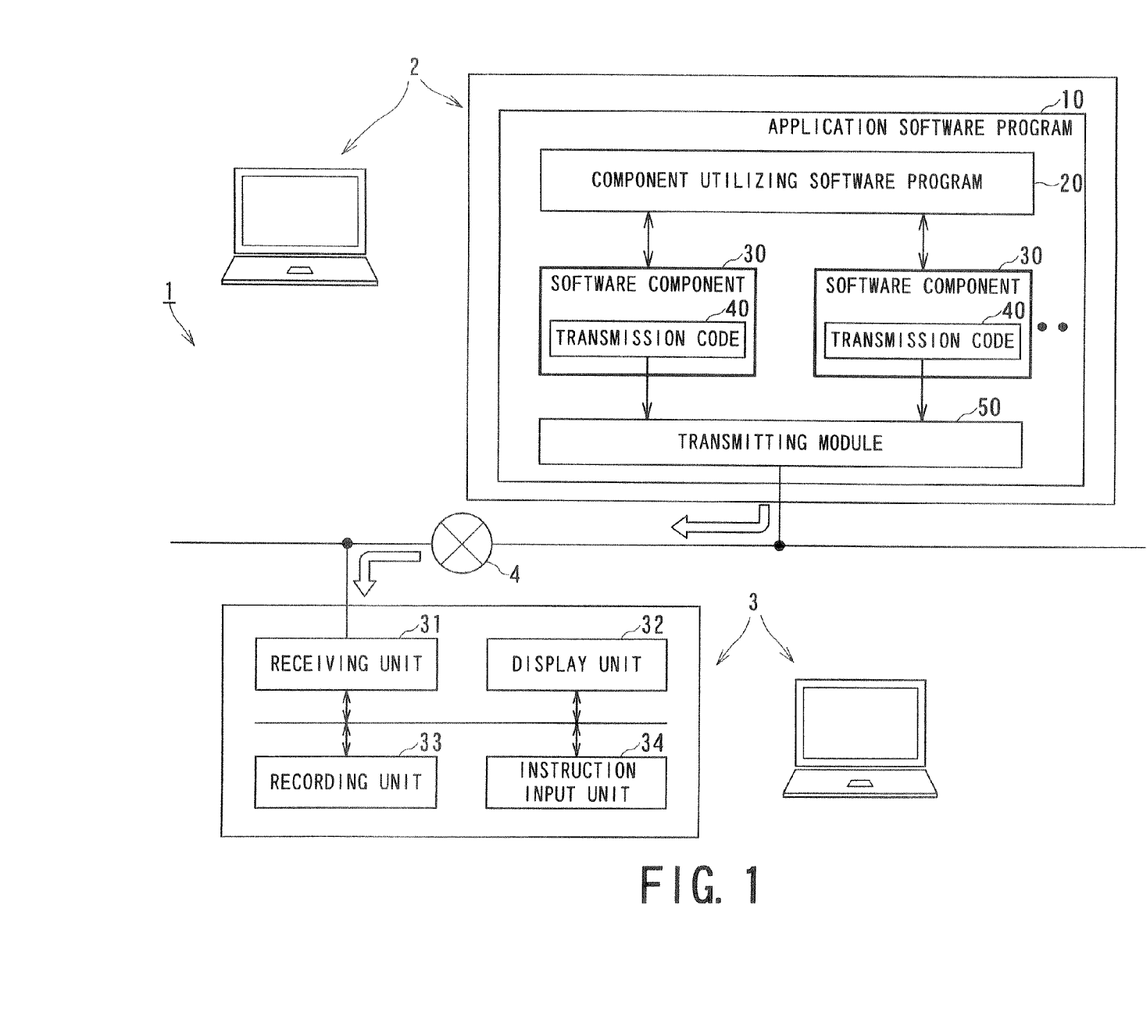
FIG. 1 illustrates an exemplary system configuration of a software component management system according to an embodiment of the present invention.

FIG. 1 illustrates an exemplary system configuration of a software component management system 1 according to an embodiment of the present invention.

The software component management system 1 includes a component utilizing terminal 2 and a component managing server 3 that are connected to each other via a telecommunication line 4.

The component managing server 3 is normally located on the side of the administrator, who is in a management department, of software components 30, and the component utilizing terminal 2 is normally located on the side of the user of the software components 30.

The software components 30 are program segments obtained by dividing a program by function, and normally refer to functional units of a general-purpose program. As in the case of components of an apparatus, combining the software components 30 or adding another software program to the combination of the software components 30 can create a larger software program (application software program) with specific functions.

The software components 30 can be of any type or size as long as they are general-purpose programs and can be used as components. For example, general-purpose programs, such as a Fourier analysis program and an accessing program for accessing a database having a predetermined data structure, can be used as the software components 30.

An administrator of the software components 30 is a person who is responsible for holding and managing various software components 30. An administrator delivers a software component 30 in response to a request from a software component user.

The delivery of the software component 30 generally involves making an agreement about who can use the software component 30 for how long and on which terminals (hereinafter, information about such an agreement is referred to as "service contract information").

The administrator is responsible for keeping track of how the delivered software component 30 is used and promptly providing appropriate users with information about defects and scalability of the software component 30.

The administrator is also responsible for properly maintaining version control of the software component 30 and providing the users with version information.

On the other hand, a user of the software component 30 is a person who receives the software component 30 delivered by the administrator, and uses the received software component 30 to develop a new application software program 10.

The application software program 10 is developed using the component utilizing terminal 2. Examples of the component utilizing terminal 2 include, but are not specifically limited to, a general-purpose personal computer.

FIG. 1 also illustrates an exemplary basic configuration of the application software program 10 developed on the component utilizing terminal 2.

The application software program 10 includes the software components 30 delivered from the administrator, a component utilizing software program 20 for using the software components 30, and a transmitting module (second software subcomponent) 50.

The application software program 10 may also be configured to include a proprietary software component developed by the user (i.e., developer of the application software program 10) or a software program developed without using software components.

Each software component 30 is a functional unit which performs a predetermined function. For example, in the application software program 10 of analytic type, a software component 30 is a software unit which performs a Fourier transform function.

On the other hand, the component utilizing software program 20 is a software unit which uses the software components 30. In the example described above, the component utilizing software program 20 inputs time-series data into the software component 30 which performs the Fourier transform function, receives Fourier-transformed frequency data from the software component 30, and modifies or edits the received data as required.

In the present embodiment, the software components 30 are provided with the transmitting module 50 and each software component 30 includes transmission code (first software subcomponent) 40. These are features of the present invention and different from the related art.

The transmission code 40 is code (program) for automatically transmitting component identifying information and service contract information about the software component 30 to the component managing server 3 when the software component 30 is called and started during the execution of the application software program 10. Specifically, these pieces of information are first transmitted to the transmitting module 50 and further to the component managing server 3 via the telecommunication line 4.

The transmitting module 50 is a program unit for transmitting device identifying information obtained by itself to the component managing server 3, as well as for transmitting information received from the transmission code 40 to the component managing server 3.

The transmitting module 50 is also delivered from the administrator. Therefore, if each software component 30 is referred to as a first software component, the transmitting module 50 can be referred to as a second software component.

The device identifying information is information, such as an IP address, for identifying the component utilizing terminal 2, and is common information independent of the type of the software component 30. Therefore, the transmitting module 50, which is a common software unit, is given a role of obtaining the common information.

Alternatively, the transmission code 40 of each software component 30 may transmit the device identifying information as well as the component identifying information and service contract information. In this case, the transmitting module 50 transmits, via the telecommunication line 4, information received from the transmission code 40 to the component managing server 3 as it has been received.

It is preferable that the software components 30 and the transmitting module 50 be provided in a form that cannot be internally modified by the users, that is, provided as black box components. The software components 30 and the transmitting module 50 are software units that perform predetermined functions and can be used by the users as long as their external specifications are clear. If improper modifications are made, the administrator cannot guarantee the quality of the delivered software components 30.

In the present embodiment, the component identifying information, service contract information, and device identifying information transmitted from the component utilizing terminal 2 to the component managing server 3 allows the detection of unauthorized use of the software components 30. Elimination of unauthorized use is an important effect of the present embodiment. From this point of view, it is again preferable to provide the software components 30 and the transmitting module 50 in the form of black box components so as to prevent the transmission code 40 or the like from being intentionally deleted.

For achieving the black box components, the software components 30 and the transmitting module 50 can be saved as binary data and delivered to the users.

The component identifying information, service contract information, and device identifying information transmitted from the component utilizing terminal 2 online is received by the component managing server 3.

As illustrated in FIG. 1, the component managing server 3 includes a receiving unit 31, a display unit 32, a recording unit 33, and an instruction input unit 34. Information input to the receiving unit 31 can be monitored online via the display unit 32. Alternatively, the information can be monitored or analyzed online after being temporarily recorded in the recording unit 33.

On the basis of the information input to the receiving unit 31, the administrator can detect, in a timely manner, improper use of the software component 30 by the user. The result is that more appropriate directions for the use of the software component 30 can be provided to the user and that efficiency in the development of the application software program 10 can be improved.

Moreover, the use of the service contract information and device identifying information allows easy detection of unauthorized use of the software component 30 by the user. This can lead to the prevention of unauthorized use of the software component 30.

(2) Configuration and Operation of Software Component

Figure 2:
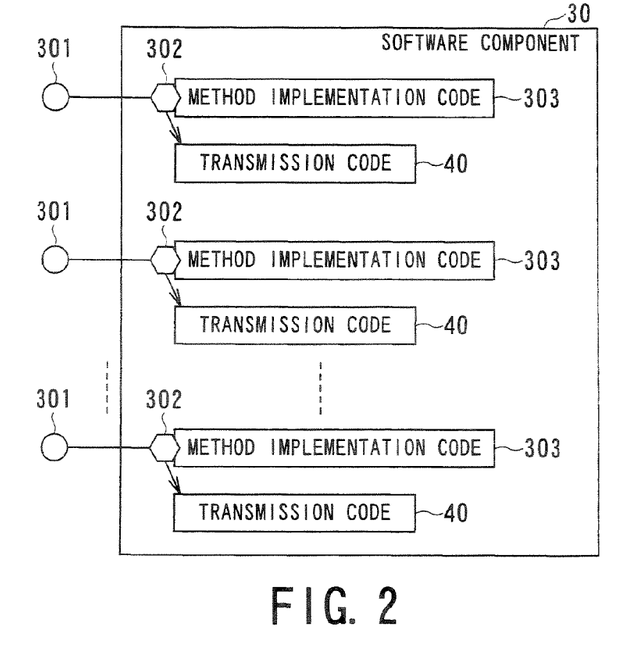
FIG. 2 illustrates an exemplary configuration of a software component according to an embodiment of the present invention.

FIG. 2 illustrates an exemplary configuration of the software component 30. The software component 30 includes at least one group having a method call interface 301 for receiving a call from the outside (component utilizing software program 20), method implementation code (software module) 303 started when the method call interface 301 is called, a transmission-code call hook point 302 for starting the transmission code 40 when the method implementation code 303 is started, and the transmission code 40.

The method implementation code 303 is a software module in which functions originally intended to be performed by the software component 30 are described. The method implementation code 303 is a concept similar to a software module referred to as a subroutine or a function. The method implementation code 303 is often referred to as a "method" in object-oriented languages, such as Java and C++. Hereinafter, such a software module is referred to as a "method".

The software component 30 normally includes multiple methods, but may be composed of a single method.

When the software component 30 includes multiple methods, any one of these methods may be selected and provided with the method call interface 301, the transmission-code call hook point 302, and the transmission code 40. In this case, it is preferable that a method that is always called during the execution of the software component 30 be selected. Examples of the method that is always called include a method for the initialization of the software component 30, and a method for post-processing at the termination of the software component 30. In programming languages, such as Java, C++, and C#, methods referred to as a constructor and a destructor correspond to such a method.

The method call interface 301 is an interface used for receiving a call from the component utilizing software program 20, which is outside the software component 30. The method call interface 301 is achieved by individual method definitions of "class" and "interface" in programming languages, such as Java, C++, and C#.

The transmission-code call hook point 302 is a mechanism of a hooking means that temporarily stops the execution of the method implementation code 303 when the method implementation code 303 is started, and starts the transmission code 40. Generally, hooking refers to preempting an input or a message to perform proprietary processing thereon. In the present embodiment, the transmission code 40 temporarily preempts the processing initiative of the method implementation code 303. Then, upon completion of the processing of the transmission code 40, the method implementation code 303 is resumed. Specific examples will be given below.

The operation of the software component 30 and transmitting module 50 configured as described above will be described with reference to FIG. 3 and FIG. 4.

Figure 3:
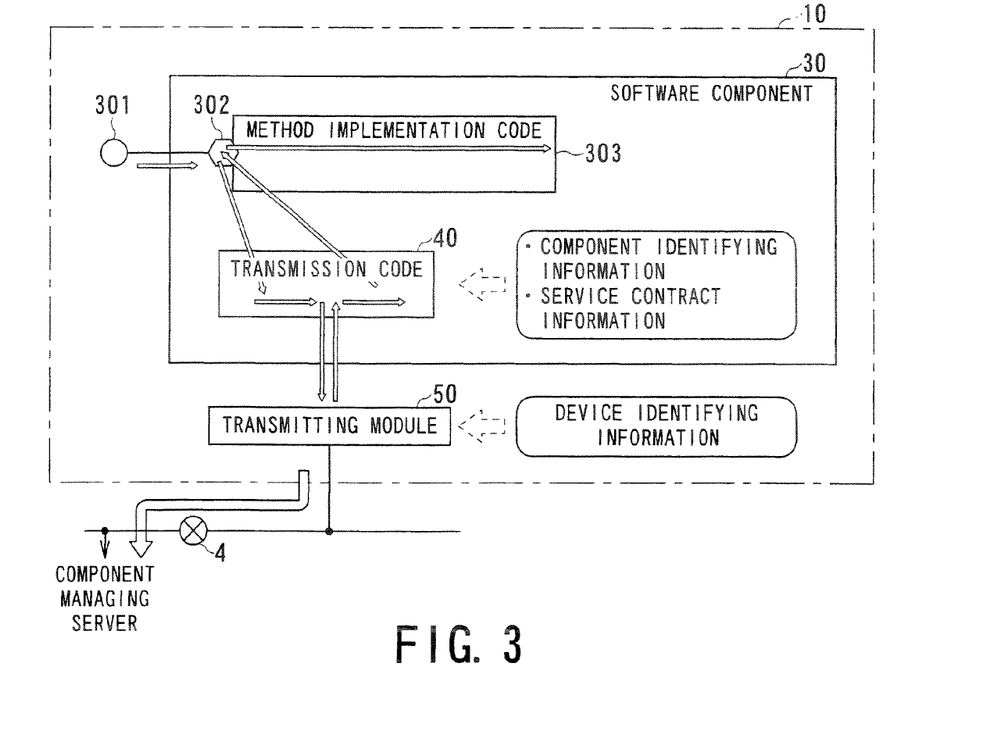
FIG. 3 illustrates an exemplary configuration and processing flow of the software component and a transmitting module.
Figure 4:
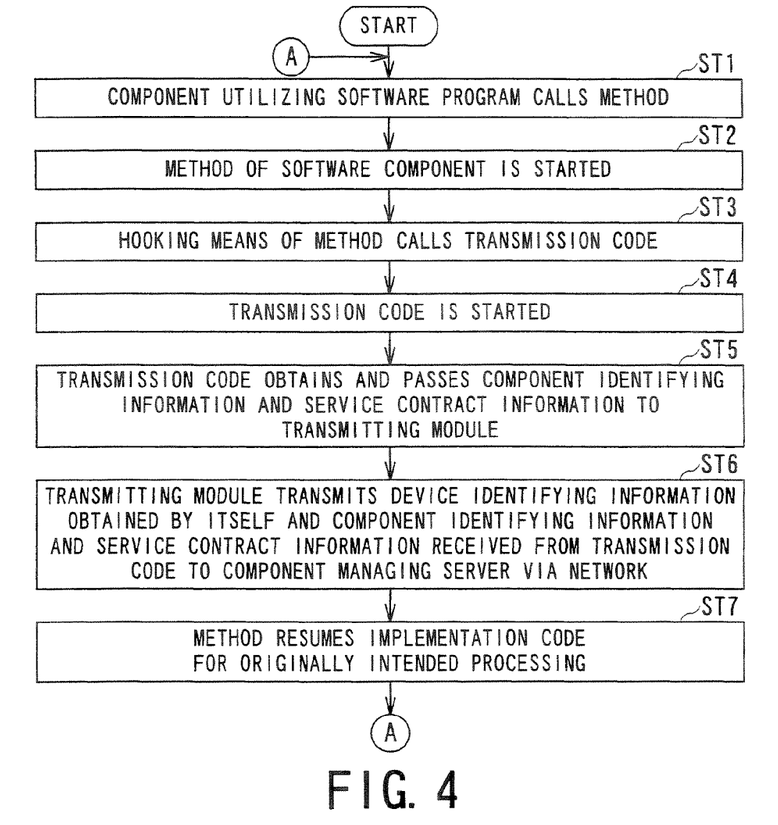
FIG. 4 is a first flowchart illustrating an exemplary processing flow of the software component and transmitting module.

FIG. 3 is a configuration diagram of the software component 30 and transmitting module 50. In FIG. 3, a processing flow of the software component 30 and transmitting module 50 is indicated by arrows. FIG. 4 is a flowchart illustrating a processing flow of the software component 30 and transmitting module 50.

First, the component utilizing software program 20 calls the method implementation code 303 of the software component 30 via the method call interface 301 (step ST1 in FIG. 4). The method implementation code 303 is started by this call (step ST2).

Next, the hooking means of the transmission-code call hook point 302 hooks (preempts) the operation of the method implementation code 303 and calls the transmission code 40 (step ST3). The transmission code 40 is started by this call (step ST4). Alternatively, the transmission-code call hook point 302 may pass, as needed, an argument at the start of a function to the transmission code 40.

The transmission code 40 reads component identifying information and service contract information from predetermined memory and passes the read information to the transmitting module 50 (step ST5).

Figure 5:
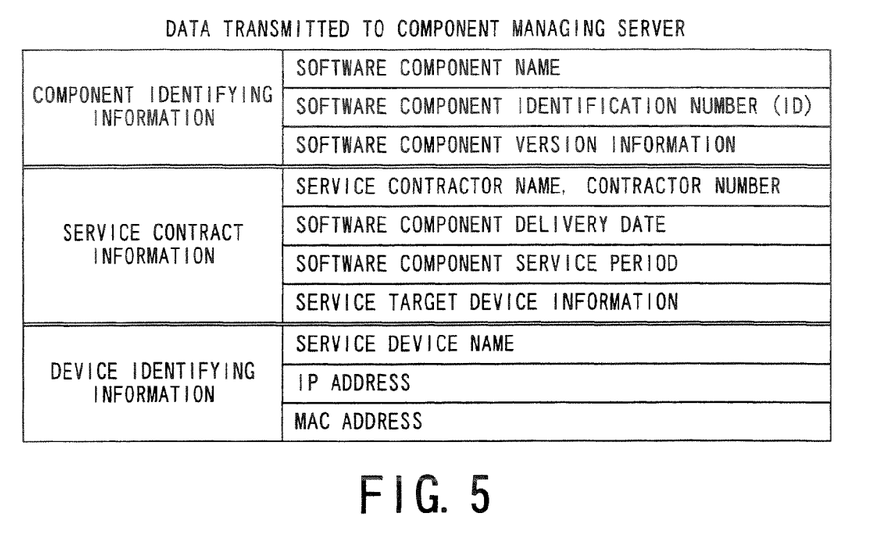
FIG. 5 illustrates exemplary component identifying information, service contract information, and device identifying information.

FIG. 5 illustrates exemplary component identifying information and service contract information. The component identifying information includes, for example, the name, identification number (ID), and version information of the software component 30.

The service contract information includes, for example, a service contractor name, a contractor number, a date on which the software component 30 was delivered, the period of use of the software component 30, and information about a target device on which the software component 30 is to be used.

Since the component identifying information is transmitted to the administrator of the software component 30, the administrator can keep track, in real time, of which version of which software component 30 is currently used by which user and where. Moreover, the administrator can quickly verify the conformity of the software component 30 to a promise (contract) made before delivery.

On the other hand, the transmitting module 50 reads, by itself, device identifying information from predetermined memory. FIG. 5 also illustrates exemplary device identifying information, which includes, for example, the name, IP address, and MAC address of a device (component utilizing terminal 2) being used. The device identifying information allows accurate identification of the component utilizing terminal 2 currently actually being used.

The transmitting module 50 transmits the device identifying information obtained by itself, together with the component identifying information and service contract information received from the transmission code 40, to the component managing server 3 via the telecommunication line 4 (step ST6).

After the transmission of the information to the component managing server 3, the process returns to the processing of the method implementation code 303, and the execution of implementation code for originally intended processing is resumed (step ST7).

In the component managing server 3, the component identifying information, service contract information, and device identifying information received at the receiving unit 31 is recorded in the recording unit 33 and displayed, as required, in the display unit 32 in real time.

Of these pieces of information temporarily recorded in the recording unit 33, necessary information can be retrieved on the basis of an instruction from the instruction input unit 34 and displayed in the display unit 32 offline as well as online.

Figure 6:
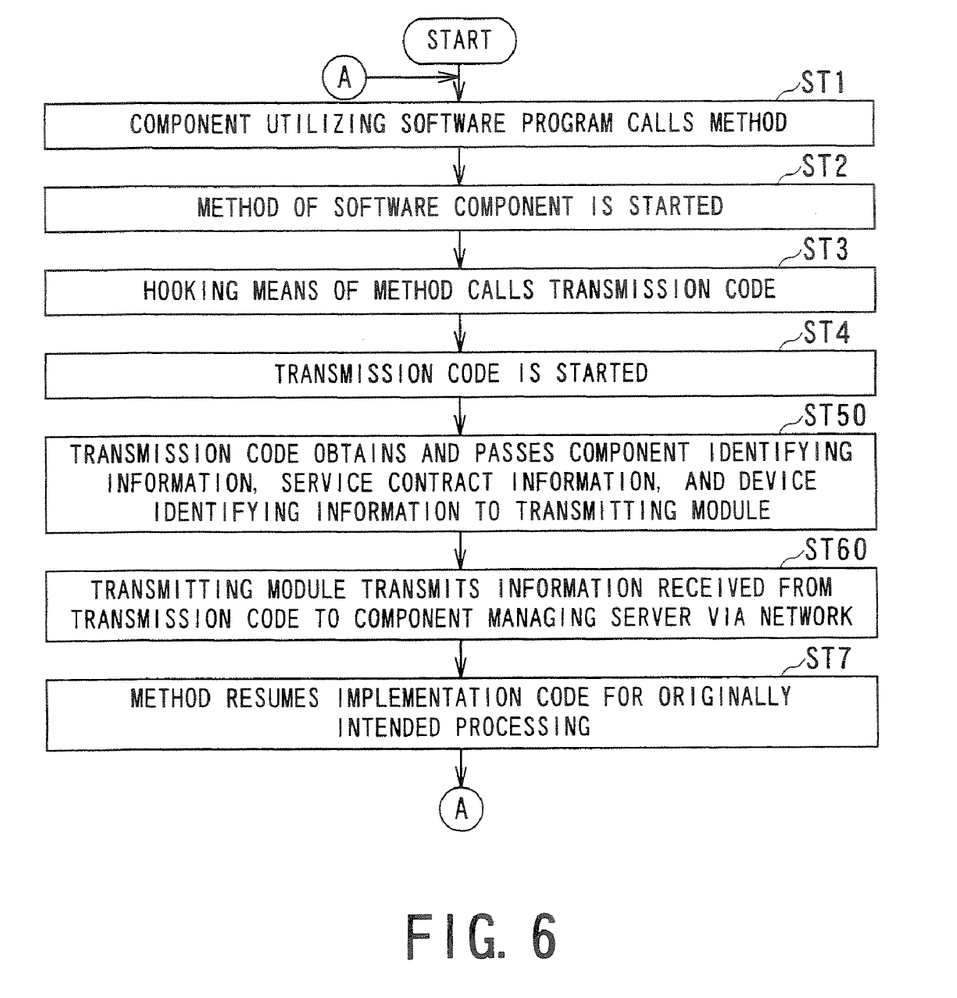
FIG. 6 is a second flowchart illustrating an exemplary processing flow of the software component and transmitting module.

FIG. 6 is a flowchart illustrating a processing flow of the software component 30 and transmitting module 50 according to another embodiment (second embodiment).

In this embodiment, the transmission code 40 obtains and passes component identifying information, service contract information, and device identifying information to the transmitting module 50 (step ST50). The transmitting module 50 simply transmits the information received from the transmission code 40 to the component managing server 3 (step ST60). The other steps are the same as those illustrated in the flowchart of FIG. 4 and are given the same reference numerals as those in FIG. 4.

Figure 7:
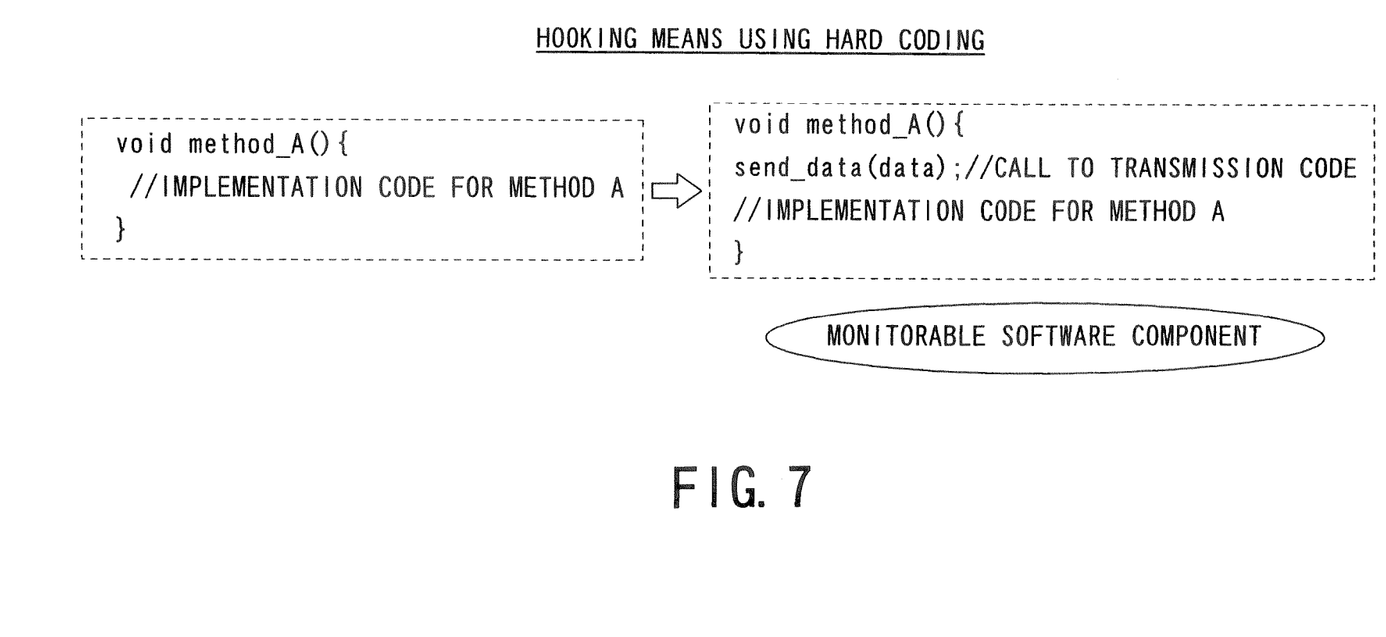
FIG. 7 illustrates an example of hooking means using hard coding.
Figure 8:
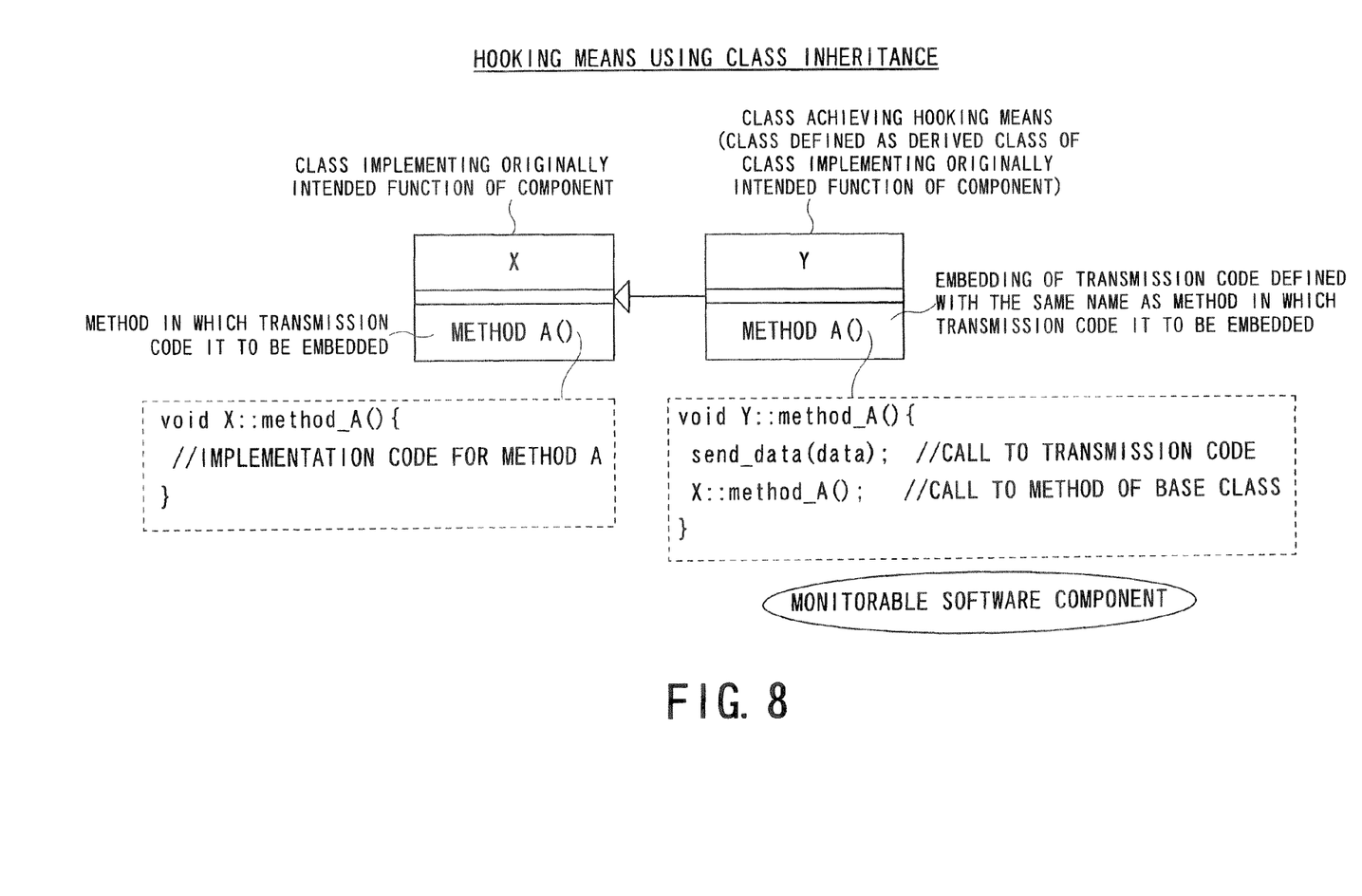
FIG. 8 illustrates an example of hooking means using class inheritance.
Figure 9:
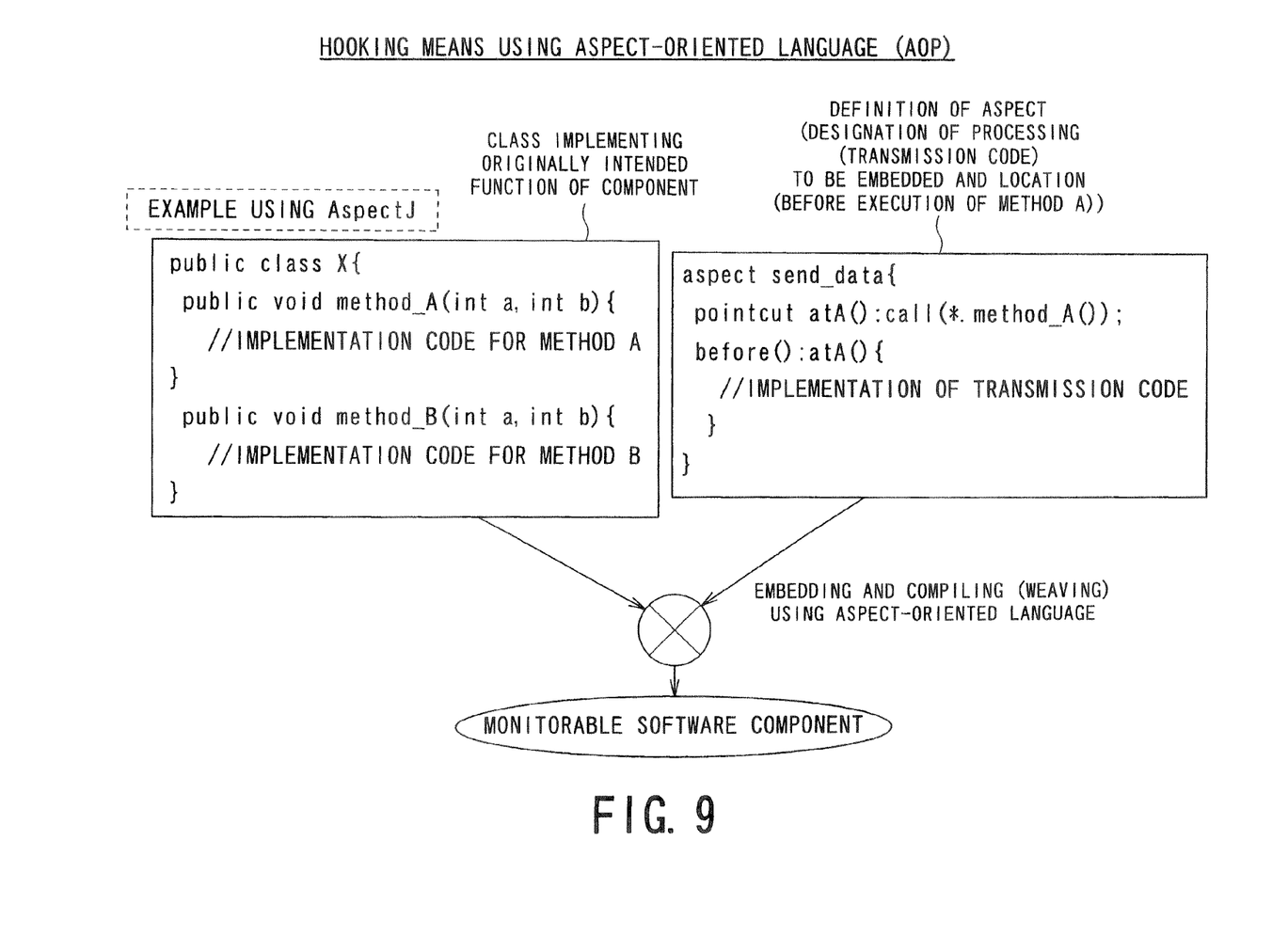
FIG. 9 illustrates an example of hooking means using an aspect-oriented language.

FIG. 7 through FIG. 9 illustrate exemplary hooking means in step ST3.

FIG. 7 illustrates an example of hooking means using hard coding. In this hooking means, code for calling the transmission code 40 is directly described in implementation code for a method. The left diagram in FIG. 7 illustrates a known method ("method A" in this example) that does not include code for calling the transmission code 40. In practice, code for an originally intended function of the software component 30 will be described in the second line (comment line).

The right diagram in FIG. 7 illustrates an exemplary hooking means achieved by hard coding. The transmission code 40 is called by code ("send_data(data)") described in the second line.

This form of hooking means has the advantage of requiring no special knowledge other than programming knowledge, but has the disadvantage of being inefficient. Specifically, if there are two types of software components 30, one having the transmission code 40 and the other not having the transmission code 40 (i.e., not required to be monitored by the administrator), and both of which need to be maintained, implementation code for the method A is included in both types of the software components 30. Therefore, any change in implementation code for the method A must be reflected in all the software components 30.

FIG. 8 illustrates an example of hooking means using class inheritance. In this form, a hooking means of the software component 30 described in an object-oriented language is achieved by class inheritance.

In the left diagram of FIG. 8, a class that implements an originally intended function of the software component 30 is defined as a base class. In the right diagram of FIG. 8, a class that achieves the embedding of the transmission code 40 is defined as a derived class. In this case, the derived class defines a method having the same name and argument as those of a method ("method A" in this example) in which the transmission code 40 is to be embedded, and thereby creates a virtual function. Thus, by using a method of the base class in this virtual function, a monitorable software component is achieved.

This form of hooking means has the advantage of allowing easy maintenance of two types of software components 30, one having the transmission code 40 and the other not having the transmission code 40, since implementation code for an originally intended function of the software component 30 exists only in one class. However, this form of hooking means has the disadvantage that if the base class has a plurality of methods in which the transmission code 40 is to be embedded, options as to whether the transmission code 40 is to be embedded increase the number of classes required.

FIG. 9 illustrates an example of hooking means using an aspect-oriented language (AOP). In this form of hooking means, an aspect-oriented language, such as AspectJ or Hyper/J, is used to describe the software component 30, and the transmission code 40 defined as an aspect is embedded in the existing software component 30 to achieve a monitorable software component.

As in the case of the hooking means using class inheritance, this form of hooking means has the advantage of allowing easy maintenance of two types of software components 30, one having the transmission code 40 and the other not having the transmission code 40, since implementation code for an originally intended function of the software component 30 exists only in one class. Moreover, a location in which the transmission code 40 is to be embedded can be specified or changed with low operating costs by using high descriptive capabilities of the aspect-oriented language.

However, this form of hooking means has the disadvantage of higher costs associated with programming education and the like, since aspect-oriented languages currently have not yet been as widely used as object-oriented languages.

As described above, with the software component 30 and software component management system 1 of the present embodiment, it is possible to transmit, reliably and in real time, management information and use information about the software component 30 to the administrator who delivered the software component 30. This can facilitate the appropriate use of software components, improve the efficiency of software development, and eliminate or prevent the unauthorized use of the software components.

The present invention is not limited to the embodiments described above, but can be implemented in practice by modifying the components within the scope of the present invention. Moreover, the present invention can be achieved in various manners by appropriately combining the plurality of components disclosed in the embodiments described above. For example, some of all the components disclosed in an embodiment may be removed. Moreover, components in different embodiments may be appropriately combined.

What is claimed is:

1. A software component stored in a non-transitory computer-readable medium, the software component comprising:
   at least one software module executable by a computer, the software module being delivered from a management department under a contract between the management department and a user of the software module, and the computer being located on the side of the user;
   a first software subcomponent configured to transmit component identifying information for identifying the software component to a software component managing server when the software module is executed, the software component managing server being located in the management department, wherein the component identifying information includes service contract information for the software component, and wherein the service contract information includes at least one of information about a user who can use the software component, information about a device on which the software component can be used, and a time period during which the software component can be used; and
   a second software subcomponent configured to transmit device identifying information for identifying the computer on which the software component is executed, to the software component managing server when the software module is executed, wherein the device identifying information includes at least one of an IP address and an MAC address of the computer,
   wherein the component identifying information and the device identifying information transmitted from the computer are recorded or displayed by the software component managing server to verify whether the software module is executed in the computer, which is agreed to be used under the contract.

2. The software component according to claim 1, wherein the component identifying information comprises at least one of a name, an identification number, and version information of the software component.

3. The software component according to claim 1, wherein the first software subcomponent transmits the component identifying information to the second software subcomponent, and the second software subcomponent transmits the received component identifying information and the device identifying information to the software component managing server.

4. The software component according to claim 1, wherein the first software subcomponent is started by hooking means of the software module, and the second software subcomponent is started by the first software subcomponent.

5. The software component according to claim 1, wherein the software component delivered from a management department is in the form of binary data.

6. A software component management system comprising:
   a terminal configured to develop an application software program by incorporating a software component delivered from a management department under a contract between the management department and a user of the software component or to use the developed application software program under the contract, the terminal being located on the side of the user; and
   a software component managing server connected via a telecommunication line to the terminal and configured to receive at least component identifying information for identifying the software component and device identifying information for identifying the terminal, the software component managing server being located in the management department,
   wherein the software component includes:
      at least one software module executable by the terminal;
      a first software subcomponent configured to transmit the component identifying information for identifying the software component to the software component managing server when the software module is executed, wherein the component identifying information includes service contract information for the software component, and wherein the service contract information includes at least one of information about a user who can use the software component, information about a device on which the software component can be used, and a time period during which the software component can be used; and
      a second software subcomponent configured to transmit the device identifying information for identifying the terminal on which the software component is executed, to the software component managing server when the software module is executed, wherein the device identifying information includes at least one of an IP address and an MAC address of the component utilizing terminal,
   wherein the component identifying information and the device identifying information transmitted from the terminal are recorded or displayed by the software component managing server to verify whether the software module is executed in the terminal, which is agreed to be used under the contract.

7. The software component management system according to claim 6, wherein the component identifying information comprises at least one of a name, an identification number, and version information of the software component.

8. The software component management system according to claim 6, wherein the first software subcomponent transmits the component identifying information to the second software subcomponent, and the second software subcomponent transmits the received component identifying information and the device identifying information to the software component managing server.

9. The software component management system according to claim 6, wherein the first software subcomponent is started by hooking means of the software module, and the second software subcomponent is started by the first software subcomponent.

10. The software component management system according to claim 6, wherein the software component delivered from the management department is in the form of binary data.

* * * * *